Jan. 9, 1951     H. C. FLINT     2,537,640
SEAT CUSHION
Filed May 27, 1946
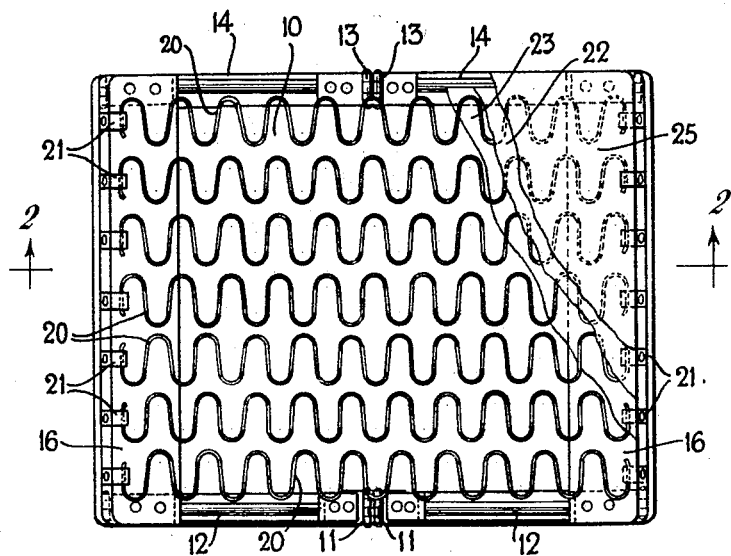
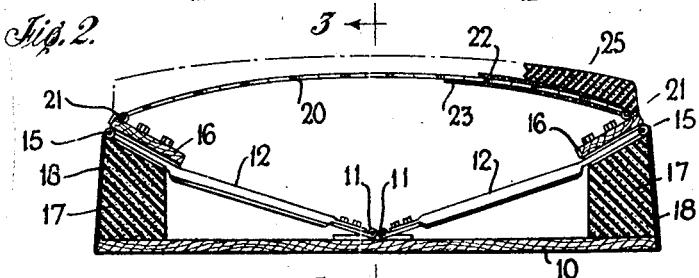
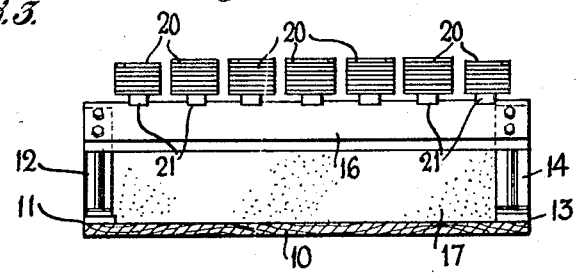
INVENTOR
HYLAND C. FLINT
BY
ATTORNEYS Patented Jan. 9, 1951

2,537,640

UNITED STATES PATENT OFFICE 2,537,640

SEAT CUSHION

Hyland C. Flint, Akron, Ohio, assignor to The Firestone Tire & Rubber Company, Akron, Ohio, a corporation of Ohio Application May 27, 1946, Serial No. 672,371

3 Claims. (Cl. 155—179)

This invention relates to seat cushions, and more especially it relates to seat cushions wherein metallic spring elements and masses of yielding material such as cellular or foamed rubber composition are combined advantageously to produce a structure of superior characteristics.

The seat cushion of the invention is of the type that employs metallic spring elements such as constitute the subject matter of the Kaden Reissue Patent No. 21,263, issued November 14, 1939. Each spring unit of the Kaden type consists of a transversely flat structure made up of a single spring wire bent into a longitudinal succession of undulations or sinuosities, and arranged to be anchored at its respective ends. The spring unit is tempered while it is longitudinally coiled in a relatively tight coil, and is uncoiled so as to present an upwardly arched or bowed appearance when mounted for use. Due to its preloaded arcuate set, the spring unit strongly resists forces that tend to flatten it.

Seats employing spring units of the character mentioned heretofore have required lateral spring-anchoring rails of substantial strength and rigidity to oppose the inward pull of the arcuate spring units, which pull is increased when load is imposed upon the seat, as when an occupant is seated thereon. The presence of the rigid side rails is not too objectionable in seats of adequate width, but in seats of narrow width (16 inches) said side rails may be extremely uncomfortable, especially to occupants of larger than average size. Furthermore, it is characteristic of the Kaden type spring that the shorter its span, the greater its resistance to deflection and the faster its recovery to normal after the deflecting force is removed. It is to the relief of both said objectionable conditions that this invention primarily is directed.

Accordingly, the chief objects of the invention are to improve the comfort of individual seat cushions employing Kaden type spring elements; and to provide a seat cushion of the character mentioned having relatively slow recovery or rebound. A more specific object is to obviate the use of fixed anchorage rails for engaging opposite ends of the spring elements. Other objects will be manifest as the description proceeds.

Of the accompanying drawing:

Fig. 1 is a plan view of a seat cushion embodying the invention, a part thereof being broken away to reveal underlying structure;

Fig. 2 is a section on line 2—2 of Fig. 1; and
Fig. 3 is a section on line 3—3 of Fig. 2.

Referring to the drawing, there is shown a seat cushion comprising a flat base member 10 of general oblong shape, said base being composed of wood, plywood, or any similar suitable material. Located at the front margin of the base 10, adjacent to and on opposite sides of the fore-and-aft centerline of the base, are hinges 11, 11, said hinges being secured to the base and to respective arms or braces 12, 12 that extend obliquely upwardly in opposite directions. At the rear margin of the base an exactly similar pair of hinges 13, 13 are secured to the base and to respective arms 14 that extend obliquely upwardly in opposite directions. The two arms 12, 14 on either side of the fore-and-aft centerline of the base constitute a pair, the arms of each pair thereof being connected to each other at their outer ends by tie rods 15. The outer, free ends of each pair of arms 12, 14 also carry respective terminal strips 16, which strips overlie the respective rods 15. Each pair of arms 12, 14 is supported in the angular position shown by a supporting block 17 that is composed of resilient rubber composition, preferably cellular or foam rubber, said block being adhered to the base 10 and to the overlying terminal strip 16. Strips of fabric 18 are attached to the respective terminal strips 16 and base 10 so as to cover the outer lateral face of each supporting block 17. At the time the fabric strips 18 are applied the supporting blocks 17 are subjected to slight compressional stress; thereafter the fabric strips retain the blocks normally under such stress. The arrangement is such that said fabric strips also retain the arms 12, 14 normally at a determinate angle with relation to the base 10, which angle is about 20 degrees.

Spanning the base 10 above the structure hereinbefore described is a series of spring units 20, 20 of the Kaden type hereinbefore mentioned. Said spring units are in parallelism, and are so arranged that they are upwardly arched, that is, their convex sides are uppermost. For anchoring the respective ends of said spring units, metal clips 21 are secured to each of the terminal strips 16, at the outer lateral margin thereof, each of said clips being formed with an eye or sleeve in which a terminal portion of a spring unit is swiveled. In order to prevent the spring units 20 from spreading laterally relatively of each other when under load, and to distribute over a substantial area the deflecting forces applied to the cushion, said spring units are confined between upper and lower sheets 22, 23, respectively of textile material, said sheets being bonded to the spring units 20, and to each other in the spaces between the springs and between the undulations of the latter. For so bonding said sheet material, the confronting faces thereof may be coated with rubber composition, which composition may be vulcanized after the sheet material is applied to the spring units.

The seat structure has a pad 25 covering the entire top thereof, which pad may be thicker at its lateral margins than in the intermediate region thereof to compensate for the arcuate shape of the spring units 20 and thus to provide a more nearly flat top surface. The pad 25 preferably is composed of molded cellular or foam rubber, and is retained in place in any suitable or preferred manner. It will be understood that the seat structure described may be upholstered in any suitable material in view of the situation in which it is to be employed.

In operation, when the weight of an occupant is imposed upon the seat cushion, both of the foam rubber supporting blocks 17 and the spring units 20 are put under compression, the fabric strips 18 bellowing loosely outwardly. As the blocks 17 are compressed, the free ends of the arms 12, 14 and the terminal strips 16 describe respective downwardly moving arcs that carry the spring clips 21 outwardly and away from each other, thereby flattening the spring units 20. The result is to produce a soft slow moving cushion that is comfortable to sit upon. The slow moving feature of the cushion applies also to rebound. Thus when the load on the seat is lightened or removed, the recovery of the foam rubber blocks 17 is relatively slow, and as the terminal strips 16 rise and move toward each other, the spring units 20 rapidly lose their force. Furthermore, the cushion includes no internal bulk that requires to be compressed.

The invention provides a seat cushion of light weight and simple construction, that operates in an efficient manner to provide maximum comfort, and which achieves the other advantages set out in the foregoing statement of objects.

Modification may be resorted to without departing from the spirit of the invention, or the scope thereof as defined by the appended claims.

What is claimed is:

1. A seat cushion of the character described comprising a substantially flat base upon which the cushion is supported, a series of parallel, transversely flat, upwardly arched spring units, terminal strips at opposite ends of the spring units to which the ends of the latter are pivotally connected, supporting blocks of resilient material beneath the respective terminal strips adapted to yield when the terminal strips are depressed as the result of load imposed upon said spring units, and means connected to the respective terminal strips for arresting the movement thereof as they are so depressed, said means comprising a pair of obliquely extending arms, each said pair having their upper ends connected by and being rotatably attached to a tie rod, said arms having their lower ends hingedly attached to said base.

2. A combination as defined in claim 1 including means maintaining the supporting blocks normally under determinate compressive stress, said compressive means consisting of strips of flexible material attached to said terminal strips and to said base.

3. A seat cushion of the character described comprising a substantially flat base upon which the cushion is supported, a series of parallel, transversely flat, upwardly arched spring units, a pair of terminal strips to which opposite ends of the spring units are attached, a tie rod underlying each said terminal strip, and means retarding movement of said terminal strips when the spring units are subjected to deflecting load, said means comprising a pair of obliquely extending arms having one of their ends attached to said tie rods and the other end hinged to said base, and yielding means cushioning the terminal strips as they are so moved.

HYLAND C. FLINT.

REFERENCES CITED

The following references are of record in the file of this patent:

UNITED STATES PATENTS

| Number | Name | Date |
| --- | --- | --- |
| Re. 21,263 | Kaden | Nov. 14, 1939 |
| 277,639 | Wenzell | May 15, 1883 |
| 2,207,054 | Freund | July 9, 1940 |
| 2,225,858 | Church | Dec. 24, 1940 |
| 2,233,545 | Menge | Mar. 4, 1941 |
| 2,259,534 | Reynolds et al. | Oct. 21, 1941 |
| 2,308,201 | Neely | Jan. 12, 1943 |
| 2,366,607 | Freeman | Jan. 2, 1945 |